April 18, 1950   L. F. NENNINGER ET AL   2,504,443
MILLING MACHINE TRANSMISSION AND CONTROL
Filed Nov. 15, 1943   7 Sheets-Sheet 1

Fig. 1
Fig. 2
Fig. 3

INVENTOR.
LESTER F. NENNINGER
FRED A. HASSMAN
BY Leigh W. Wright
ATTORNEY.

April 18, 1950   L. F. NENNINGER ET AL   2,504,443
MILLING MACHINE TRANSMISSION AND CONTROL
Filed Nov. 15, 1943   7 Sheets-Sheet 5

INVENTOR.
LESTER F. NENNINGER
FRED A. HASSMAN
Leigh W. Wright
ATTORNEY.

Patented Apr. 18, 1950

2,504,443

UNITED STATES PATENT OFFICE 2,504,443

MILLING MACHINE TRANSMISSION AND CONTROL

Lester F. Nenninger and Fred A. Hassman, Cincinnati, Ohio, assignors to The Cincinnati Milling Machine Co., Cincinnati, Ohio, a corporation of Ohio Application November 15, 1943, Serial No. 510,430

19 Claims. (Cl. 90—18)

This invention pertains to improvements in machine tools, and more particularly to transmission and control mechanism for milling machines.

One object of this invention is to improve the operation and control of a milling machine so that the operator at the normal operating position at the front of the machine may rapidly and conveniently select all changes in the rate of relative movement between the cutter and work in an increasing or decreasing progressive selection of rate changes by the manipulation of a single operative control lever in a plurality of operative positions determining whether the cutter or the work rates are to be changed and to effect increasing or decreasing rate changes for the cutter or for the work.

Another object of this invention is to provide in a knee and column type milling machine having a speed change transmission in the column and a feed change transmission in the knee, a single, operative control lever conveniently located for manipulation by the operator from the normal operating position at the front of the machine so as to select whether the speed or feed transmissions are to be varied by movement of the lever in one operative position, to effect increasing and decreasing rate changes in the speed change transmission by moving the control lever back and forth in another operative position, and to effect increasing and decreasing rate changes in the feed transmission by moving the lever back and forth in still another operative position.

A further object is to provide in a knee and column type milling machine having a speed change transmission in the column and a feed change transmission in the knee, a single lever control to effect increasing and decreasing selections of progressive rate changes in the transmissions and wherein the driving power from the feed transmission is automatically disconnected from the work feeding members of the machine when the single lever control is operated to effect rate changes in the feed transmission.

A still further object of this invention is to provide, in a milling machine having a column and a knee movable on guide surfaces on the column, a totally enclosed control mechanism located in cooperating pockets formed in the guide surfaces of the knee and column for transferring motion from an operating member of the knee to a member to be controlled in the column for any position of relative movement of the knee on the column.

Further features and advantages of this invention will appear from a detailed description of the drawings:

Figure 15 is a diagrammatic layout of the hydraulic control circuit.

For illustrative purposes this novel transmission and control mechanism, for obtaining more efficiently and with greater ease upon the part of the operator any desired spindle speed and any desired feed rate from a centralized single lever control, is shown applied to a conventional knee and column type vertical milling machine comprising a base 1 having an integral upright column 2 on the upper front portion of which is slidably mounted a conventional vertical spindle housing 3 containing a cutter spindle 91. On the front of the column is mounted for vertical movement on suitable guide surfaces 4, 4a and 4b, the knee 5 upon which is horizontally slidable the saddle 6 on appropriate ways 7 to and from the column 2 of the machine. On top of the saddle 6 on appropriate guideways 8 is mounted the usual work table 9 for movement on the saddle 6 in a conventional manner for such types of milling machines.

In milling machines of this general type the character of work ordinarily performed is of a very great variety as to size and character of materials, necessitating the rapid and easy selection of a great variety of spindle speeds for the milling cutters and a large variety of feed rates for the knee, saddle and table. Such machines are ordinarily used on work which would require a large number of changes of speeds and feeds for each job for each single piece being machined. As a result it is desirable to provide a relatively simple, conveniently located, and rapidly operable control means for effecting these various speed and feed changes both during the initial set-up of the job in the machine and during the multitude of dissimilar operations which are normally performed by such a machine as the work is being completed.

Figure 4:
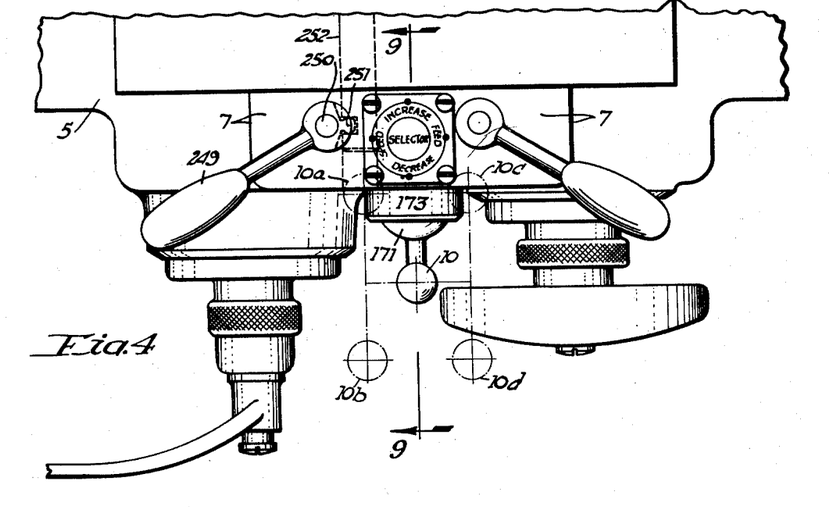
Figure 4 is an enlarged fragmentary plan view of the front portion of the knee of the milling machine shown in Figure 1, indicating the location of the centralized single lever speed and feed rate control lever as it would appear to an operator standing in the normal operating position in front of the machine.
Figure 5:
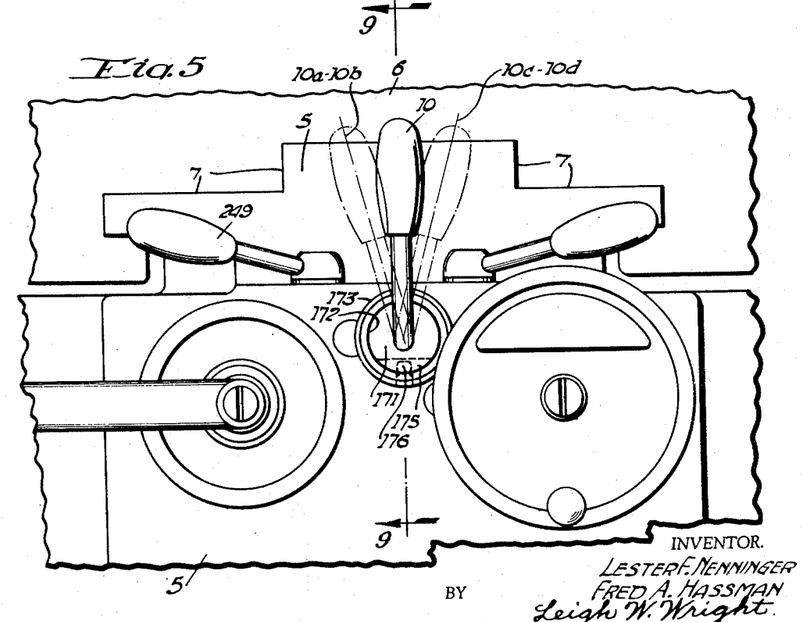
Figure 5 is an enlarged fragmentary front elevation of the knee shown in Figure 4.

In order to provide an efficient control mechanism of this type the machine is provided, as indicated generally in Figures 4 and 5, with a single lever centralized control comprising the operating lever 10 which is located on the front of the knee 5 of the machine in the most convenient location for easy manipulation by the operator. Generally, the lever 10 is operable to a series of four positions: 10a, 10b, 10c and 10d. By specific reference to Figure 4, the lever 10 is arranged to move to the left into the plane of operation passing through positions 10a and 10b and that by moving the lever to position 10a or 10b a series of increasing or decreasing speed changes may be effected in the work spindle driving transmission. The lever 10 is also arranged to be moved into the plane of operation 10c and 10d to effect a series of increasing or decreasing feed changes in the feeding mechanism of the machine. Thus, in the single control lever 10 is provided an operative control which in itself can provide increasing or decreasing presentation of all of the spindle speed changes and all of the feed changes that the machine is capable of providing.

Figure 1:
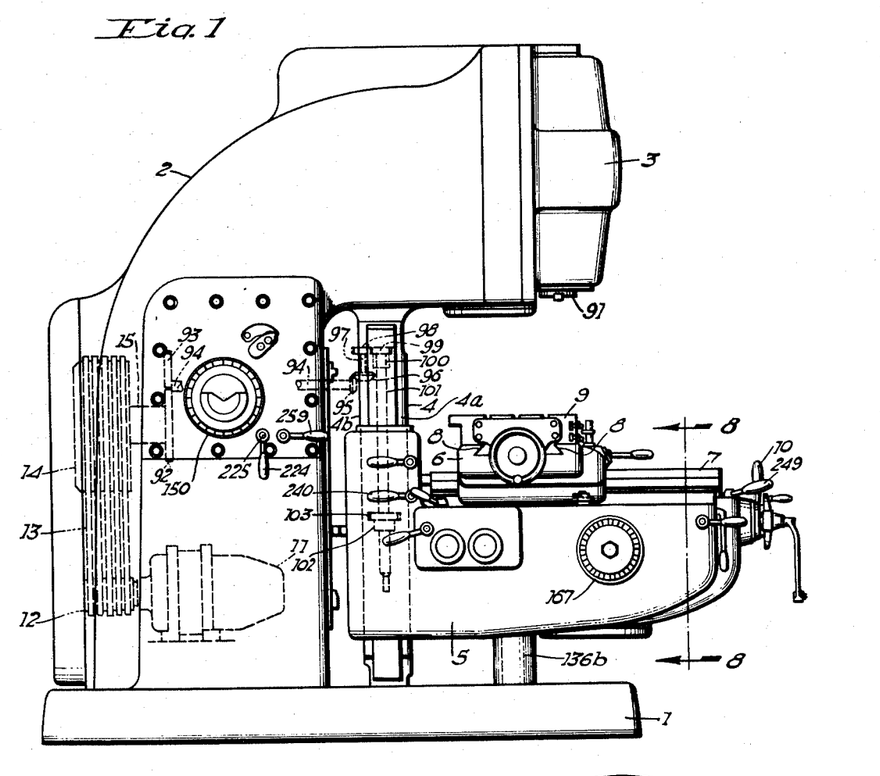
Figure 1 is a left hand end elevation of a knee and column type milling machine incorporating the features of this invention.
Figure 2:
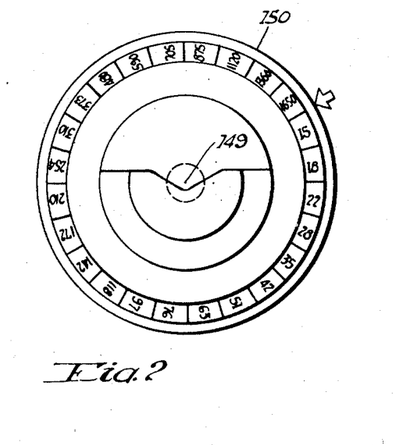
Figure 2 is an enlarged view of the indicating dial showing the spindle speeds obtained from the machine.
Figure 3:
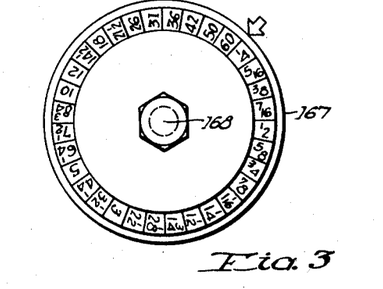
Figure 3 is an enlarged view of the indicating dial showing the feed rates which may be selected for the machine.
Figure 6:
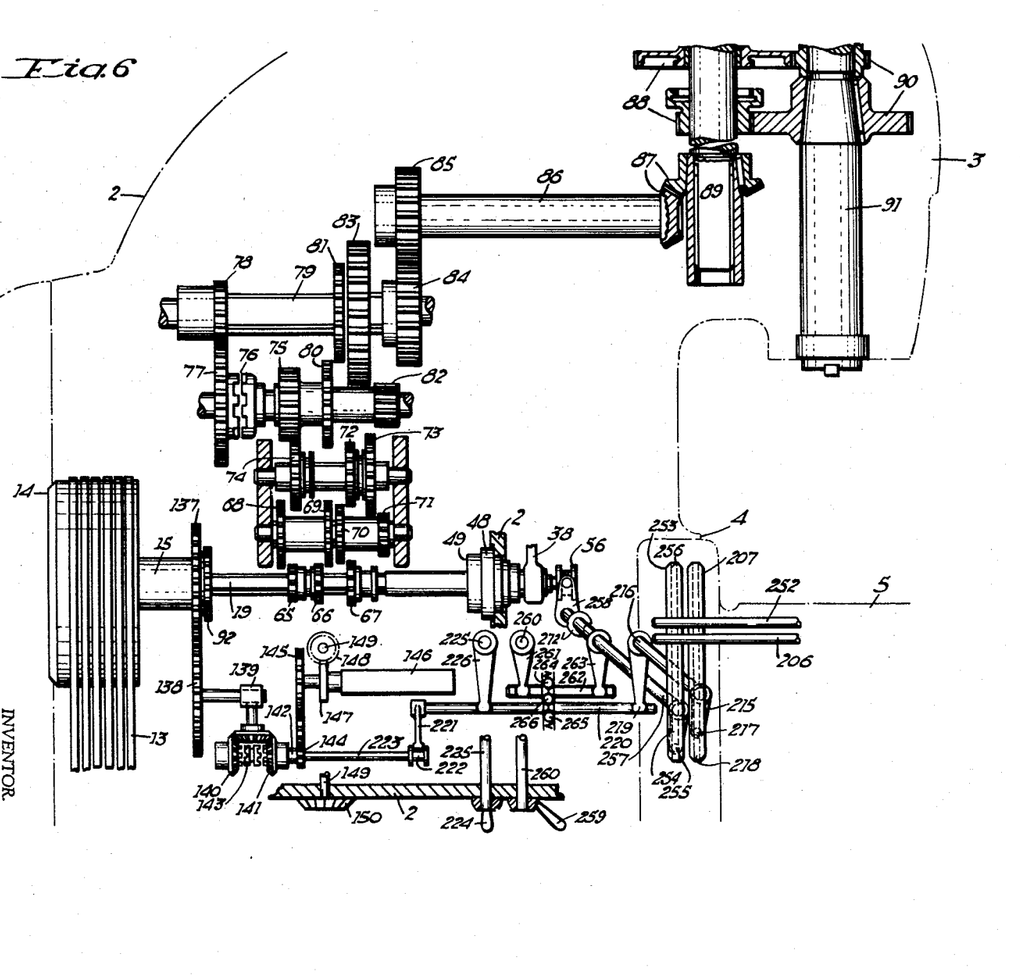
Figure 6 is a diagrammatic showing of the shiftable gear change speed transmission for driving the tool spindle.

Considering now the detailed mechanism for obtaining these desired functions of the machine, referring particularly to Figure 1, the driving power for the machine is provided by the main drive motor 11, which, through a suitable motor pulley 12 and belts 13 drives the main drive clutch pulley 14 shown best in Figures 6 and 15. This pulley 14 is rigidly mounted to the sleeve 15 by appropriate screws 16, which sleeve in turn is journaled in suitable bearings 17 in the column 2 of the machine so that it is at all times constantly rotated by the main drive motor 11 during the operation of the machine.

Power for driving the cutter spindle 91 of the machine is obtained from this constantly rotating pulley 14 through a friction clutch shown in Figure 15, comprising a driving plate 18 rigidly mounted on the pulley drive shaft 19 to which it is attached by a suitable set screw 20. In the sleeve 15 forming an integral part of the driving pulley 14 is cut an internal gear 21 in which nicely fits a composition friction plate 22. This plate may be forced into frictional driving engagement with the driving clutch plate 18 by the movable clutch plate 23 having an internal gear 24 formed in its bore upon which it is slidingly mounted on a mating gear 25 formed on the fixed member 18.

Conventional toggle actuating means is provided for forcing the plate 23 toward the plate 18 to grip the composition disc 22 between them to provide driving action from the pulley 14 to the shaft 19. This means comprises the swinging toggle arms 26 pivotally mounted on suitable pins 27 in an adjustable yoke 28 carried on the clutch member 18. Suitable friction reducing rollers 29 are provided in the ends of these toggles 26 to provide ease in operating the clutch mechanism in forcing the plate 23 toward the plate 18. A suitable actuating cam 30 having tapered surfaces 30a operating on the outer rollers 29 of the toggles 26 is mounted by its bore 31 to slide axially on the shaft 19 to cause the toggles to ride up on the tapered surface 30a of the cam 30 for engaging the friction clutch and to allow them to move down on the surface 30a when disengaging the clutch.

This cam member 30 for operating the friction clutch to engage or disengage driving power of the pulley 14 relative to the shaft 19 is actuated by a hydraulic servo-mechanism best shown in Figure 15. The cam member 30 is connected to the push rod 32 through a suitable connection indicated generally at 33 so that as the rod 32 is moved axially back and forth in a suitable bore 34 provided in the shaft 19 the member 30 will thus be operated to effect engagement or disengagement of the main drive friction clutch. This servo-clutch operating mechanism is of a conventional type shown in Patent No. 1,938,780, issued December 12, 1933, and comprises a hydraulic actuating mechanism including a fluid pressure pump 35 which supplies a constant fluid pressure through the line 36 to an annular groove 37 formed in a suitable non-rotating hydraulic connector 38 journaled on the surface 39 of the shaft 19. The annular groove 37 conveys fluid pressure from the pump 35 through passageways 40 formed in the shaft 19 which open into a cylinder bore 41 formed in the pulley drive shaft 19.

In this bore 41 is slidably mounted a piston sleeve 42 to which is rigidly connected a valve sleeve 43 by means of the pin 45, which latter sleeve 43, in turn, is appropriately rigidly connected through suitable threaded means 44 to the push rod 32. Also rigidly connected to the piston sleeve 42 by the pin 45 is the brake operating collar 46 which has an abutment surface 47 adapted to be moved into engagement with the multiple disc brake 48 having one group of friction discs rigidly held against rotation in the sleeve 49 rigidly fixed to the column 2 by suitable screws 50 and the other part of the discs attached to rotate with the shaft 19. Thus, when this friction brake 48 is operated, rotation of the shaft 19 will be arrested. The pin 45 passes through axially disposed slots 51 formed in the shaft 19 to permit axial movement of the pin 45 relative to the shaft 19. When the pin 45 and braking collar 46 are in the position shown in Figure 15 the main driving clutch will be in operation for rotating the shaft 19 and when the collar 46 is moved to the left to cause its abutment surface 47 to engage the discs 48 the shaft 19 will be locked through the friction discs in the brake to column 2 of the machine to thus prevent rotation of the shaft 19.

This mode of operation of reciprocating the push rod 32 and associated sleeves 42 and 43 is accomplished by hydraulic operating and control means in which the fluid pressure from the passageways 40 enters in the right hand portion 41a of the bore 41 and then passes through the axially disposed passageway 52 formed in the sleeve 43 from which it discharges through a passageway 53 into the annular groove 58 of the servo-control valve plunger 55. This valve plunger has fixed on its outer end an actuating spool 56 which is operated by suitable control lever and linkage means to be described, for effecting the starting and stopping of the cutter spindle of the machine. It will be noted that a suitable clearance slot 57 extending axially of the valve plunger 55 is provided about the pin 45 to permit independent motion of the plunger 55 relative to the sleeve 43.

The arrangement shown in Figure 15 illustrates the position of the parts after the main driving clutch has been put in operation and with the cutter spindle thus being driven from the main drive motor 11 and the pulley 14. Under these conditions fluid pressure coming out of the passageway 53 enters into the annular groove 58 of the valve stem 55 but cannot escape out through a passageway 59 into the passageway 60 formed in the sleeve 43 and thus into the left hand chamber 41b of the cylinder bore 41 to move the draw rod 32 further to the right, since by holding the valve plunger 55 in the desired position shown for full engagement of the clutch the push rod 32 has been moved to the right automatically by this servo-movement to cut off the port 59 to thereby bring the further movement of the push rod 32 under fluid pressure to a stop. Now when it is desired to disengage the friction clutch and cause engagement of the brake 48 the spool 56 is actuated by appropriate control means to the left, Figure 15, bringing the annular groove 61 of the valve stem 55 into alignment with the port 59 so as to permit escape of fluid freely from the chamber 41b through the passageway 60 and the port 59 into the groove 61 from where it goes through passageways 62 into an axial bore 63 formed in the valve plunger 55 from which it exhausts to atmospheric pressure to drain back to the fluid reservoir 64 of the hydraulic system. Under these conditions fluid pressure cannot escape from the port 53 since it is blocked off at the groove 58 in the valve stem 55 so that the pressure thus built up in the chamber 41a of the cylinder bore 41 moves the piston sleeve 42 and its associated sleeve 43 and the push rod 32 to the left to thereby disengage the friction clutch and bring the brake collar 46 into engagement with the friction brake 48 to arrest spindle rotation. Again, moving the control spool 56 to the right effects the automatic servo-control as described above for reengaging the main drive friction clutch to any desired degree, and as fully set forth in the above Patent No. 1,938,780.

Referring now particularly to Figure 6, there is shown diagrammatically a change speed gear transmission for driving the cutter spindle of the machine. In this instance power take-off for the spindle change speed transmission is derived from the pulley shaft 19, upon which is appropriately mounted sliding change gears 65—66 and 67 on a suitable splined driving portion of the shaft 19, and which gears may be respectively engaged with mating gears 68, 69 and 70 to provide in this illustrative example three speed changes. The gear 70 and a gear 71 are adapted to be respectively engaged by gears 72 and 73 of a shiftable compound gear 72—73 to provide two additional speed changes. Additional speed changes may be effected by the gearing 74 driving the gear 75 which through a clutch engagement at 76 drives the gear 77 and a gear 78 on a drive shaft 79 and through the gear combinations 80 and 81, and 82 and 83 rendered operative by sliding the shiftable gear 81—83 three additional speed changes may be effected in the drive shaft 79. Thus is provided a series of speed changes in a shiftable gear change speed transmission for the shaft 79 so that with constant speed rotation of the pulley 14 a plurality of speeds may be obtained for the cutter spindle drive by properly shifting the various gears described. Suitable gearing is provided comprising the gear 84 on the shaft 79 which drives a gear 85 on the shaft 86 and through appropriate bevel gearing 87 and gearing 88 on the vertical shaft 89 which connects with mating gearing 90 on the cutter spindle 91, provides the connecting power transmission to the cutter spindle in the vertical spindle housing 3.

Feed driving power take-off is obtained from a gear 92, Figures 1 and 6, rigidly mounted on the pulley sleeve 15 so as to be at all times rotated during the operation of the machine by the main drive motor 11. This gear is connected to drive a gear 93, Figure 1, rigidly mounted on a horizontally disposed drive shaft 94 appropriately journaled in the column 2 of the machine. On the forward portion of this drive shaft 94 is mounted a bevel gear 95 which in turn drives a mating bevel gear 96 on a vertical stub shaft 97 appropriately journaled in column 2 of the machine and upon which is also mounted a gear 98 which is adapted to drive a mating gear 99 having a sleeve portion appropriately journaled in the column 2 and which sleeve portion has a splined bore 100 in which is fixed the vertical splined drive shaft 101. This splined shaft 101 extends downwardly along the side of the column 2 and has its splined portion slidingly engaging in driving relationship in an appropriate sleeve 102 journaled against the axial movement in the knee 5 so that the sleeve 102 may be at all times driven from the shaft 101 for any position of vertical adjustment of the knee 5 along the ways 4.

Figure 7:
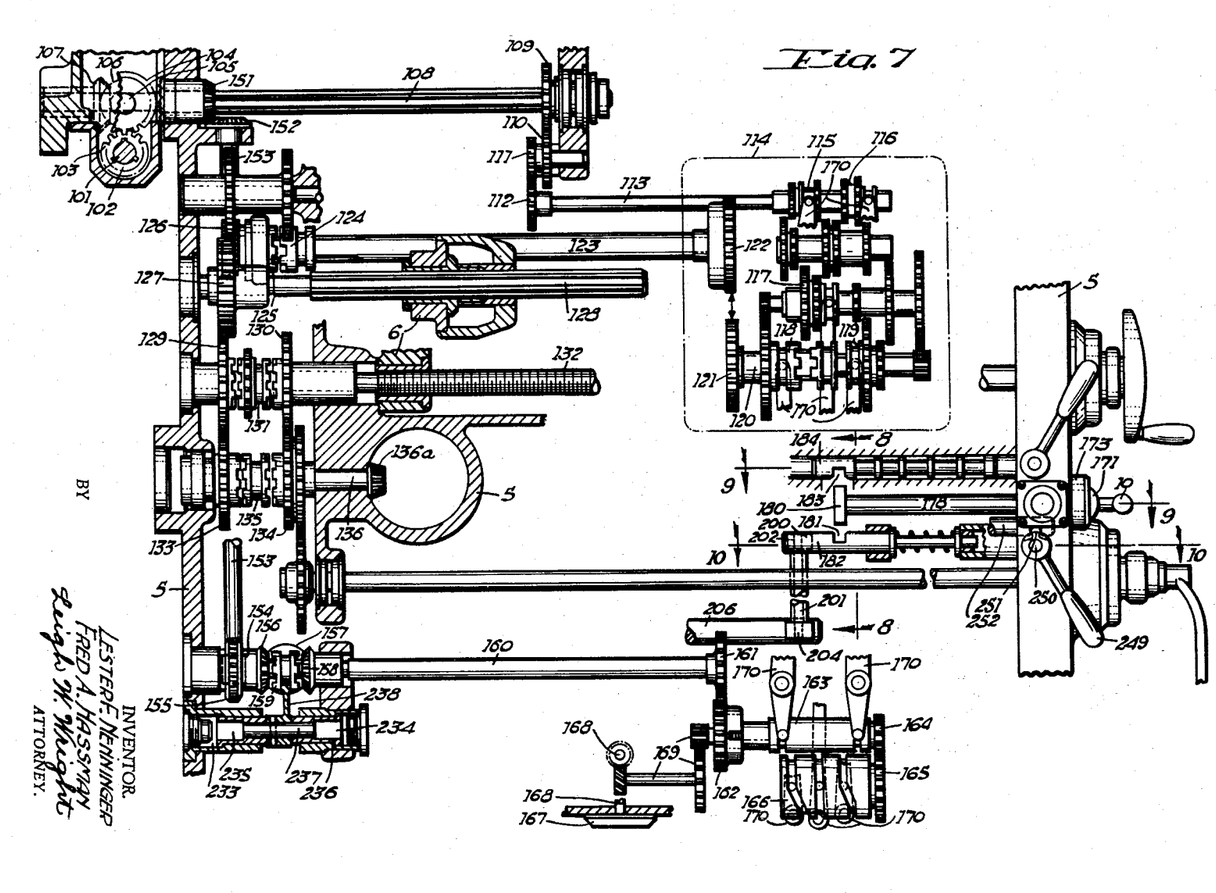
Figure 7 is a diagrammatic showing of the shiftable gear change feed provided in the knee of the milling machine.

Formed on the sleeve 102, Figure 7, is a gear 103 which, in turn, drives a mating gear 104 on a stub shaft 105 on which is formed bevel gear 106 driving a mating bevel gear 107 suitably journaled in the knee 5 of the machine. Feed power is taken off from gear 107 fixed on the shaft 108 journaled in the knee and which has a gear 109 fixed thereon driving through the gears 110 and 111 the gear 112 fixed on the input drive shaft 113 of the change feed transmission, indicated generally at 114. This transmission 114 has a series of sliding change gears 115, 116, 117, 118 and 119 which may be appropriately slid on their respective shafts into driving engagement with appropriate meshing gearing so as to provide a series of feed changes between the input shaft 113 and the output shaft 120 of the feed box 114. Since this type of transmission is of conventional design, further detailed description of this specific mechanism will not be undertaken.

On the output shaft 120 is a gear 121 which, in turn, drives a gear 122 on the feed drive shaft 123. This shaft 123 may be connected into driving engagement with or disengaged from the driving gearing which actuates the knee in vertical movement, the saddle in cross movement, and the table in feed movement by the jaw clutch 124. The left hand portion 125 of the jaw clutch 124 is connected directly to a driving gear 126 which drives a gear 127 on the spline drive shaft 128 which through suitable conventional gearing is adapted to drive the table feeding movement of the machine. Appropriate means, not shown, are provided between the shaft 128 and the table movement for connecting or disconnecting the driving power therefrom.

The gear 127 also drives a gear 129 and, through suitable reversing means, a gear 130 which latter gears may be connected alternately by means of a suitable reversing clutch 131 to rotate the saddle cross feeding screw 132 in either direction, or to disconnect the driving power therefrom. Similarly, a gear 133 is driven from gear 127 through the gear 129 and the gear 134 is driven from the gear 130. By means of an appropriate reversing clutch 135 and associated conventional gearing not shown reverse drive to the shaft 136 or arresting of power to the shaft may be effected. The shaft 136 is connected by appropriate means 136a to the vertical elevating screw 136b of the knee for effecting vertical motion therein.

The spindle change speed gear transmission is controlled by power means which shifts the various sliding gears in a predetermined sequential relationship to provide a series of progressive speed changes from the lowest to the highest speeds. In Figure 6 is diagrammatically shown the essential elements of such power gear shifting mechanism comprising a gear 137 fixed on the pulley sleeve 15 to be thereby continuously rotated at all times during the operation of the machine by main drive motor 11. This gear 137 drives a gear 138 which through appropriate transmission mechanism, indicated generally at 139, drives a pair of reversing bevel gears 140 and 141, which may be alternately connected to reversibly drive a shaft 142 by a suitable reversing clutch 143 so as to rotate the shaft 142 in one direction or the other as desired. On the shaft 142 is fixed an appropriate gear 144 which drives another gear 145 for rotating the fluid pressure selector valve 146 which effects the proper sequential shifting of the gears in the spindle transmission of Figure 6. The selector valve 146 may be connected to the various shiftable gears previously described by conventional fluid pressure actuated cylinders. Also an appropriate indicating dial 150 showing the actual speeds selected as the control valve 146 is thus driven by power in one direction or the other by actuating the clutch 143, is shown diagrammatically as driven from the spiral gear 147 rotated with the control valve 146 which drives the spiral gear 148 on the dial shaft 149 which carries the spindle speed indicating dial 150.

Similarly, the change speed gear transmission 114, Figure 7, for effecting the various feed changes in the knee also has its gears shifted in a predetermined sequential relationship by power means. Power for effecting this operation of the shifting of the feed transmission gearing is derived from a bevel gear 151 driven by the shaft 108 which, in turn, drives a mating bevel gear 152 on a shaft 153. On the shaft 153 is provided a suitable worm 154 which drives a worm wheel 155 formed on a bevel gear 156 which bevel gear 156 drives an idler bevel gear 157 in turn adapted to drive another bevel gear 158 similar to the bevel gear 156. An appropriate jaw clutch 159 may be connected to one or the other of the bevel gears 156 and 158 so as to cause the driving of the shaft 160 in one direction or the other as desired. This shaft 160 has a gear 161 which, in turn, drives a gear 162 for rotating the gear shifting cam drum 163 and through the gears 164 and 165 the gear shifting cam drum 166. Appropriate dial indicating means 167 carried on a suitable shaft 168 and driven appropriately through the mechanism 169 from the gear 162 indicates the relative positions of the cam drums 163 and 166 and therefore the positions of the gears in the feed box transmission 114 and the feeds selected. Conventional shifter arms 170 operating in conjunction with appropriate cam slots in the cam drums 163 and 166 provide means, when the cam drums are rotated, to actuate the gears of the transmission 114 in their proper sequential relationship.

Figures 8, 9, 14:
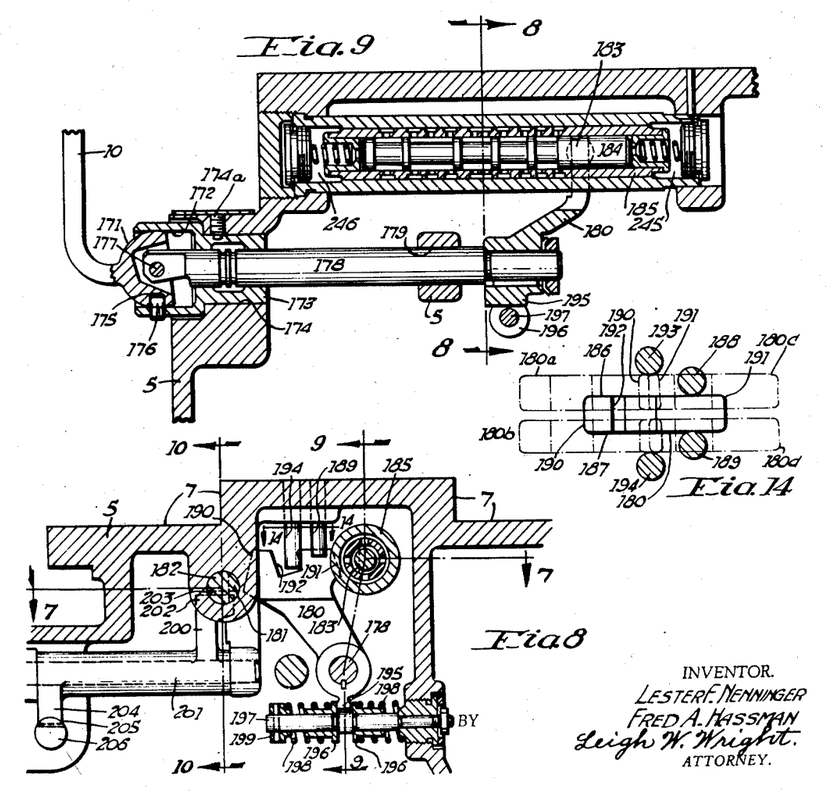
Figure 8 is a fragmentary section on the line 8—8 of Figures 1, 7 and 10, particularly showing the interconnecting mechanism of the single lever control for initiating the spindle speed changes and the feed changes and the positioning device for the control lever for its various operative positions.
Figure 9 is an enlarged fragmentary section on the line 9—9 of Figures 4, 5, 7 and 8.
Figure 14 is an enlarged diagrammatic sectional view substantially on the line 14—14 of Figure 8.

Each of these power actuating mechanisms for effecting the sequential shifting of the gears in the spindle change speed transmission and in the feed change gear transmission are effected from the common operating and control lever 10, Figures 4 and 5, when moved to the respective operating positions 10a and 10b for spindle speed changes and 10c and 10d for feed changes as set forth above. In Figure 9 is shown the operating handle 10 having an integral ball portion 171 fitting in a bore 172 of a sleeve 173 fixed in the bore 174 in the knee 5 by the set screw 174a. This ball portion is provided with a tangential slot 175, Figure 5, which nicely fits each side of ball-pointed pin 176 fixed in the outer rim portion of the sleeve 173 so that the handle may be swung in and out relative to the front of the knee 5 while its ball portion 175 rocks the slot 175 around the ball-pointed pin 176 while rotating in the bore 172 of the sleeve 173 to thereby similarly move a pivot pin 177 carried in the ball portion 171. To this pin 177 is attached the rocking and swinging rod 178 so that in and out motion of the handle 10 effects axial sliding in and out motion in the shaft 178, and rotation of the handle about the axis of the shaft 178 rocks this shaft about its axis. In this way the shaft 178 is given a combination of axial and rocking movements from the single control handle 10 by moving it to the respective positions shown in Figure 4.

The shaft 178 is appropriately supported at its inner end by a suitable bearing 179 formed in the knee 5. This shaft 178 has fixed on its inner end a shifting yoke 180 best seen in Figures 7, 8 and 14, which may be swung into an operating notch 181 formed in the actuating plunger 182 for spindle speed changes and into an actuating notch 183 formed in the shuttle valve plunger 184 of the shuttle control valve 185 when effecting feed changes for the knee, saddle, and table, by the sidewise swinging of the lever 10 from the respective positions 10a—10b and 10c—10d shown in Figure 4. These relative positions of insertion of the yoke 180 with respect to the operating notches 181 and 183 in the plunger 182 and in the shuttle valve plunger 184 are diagrammatically shown in Figure 14 for the corresponding positions of the control lever shown in Figure 4.

Figure 10:
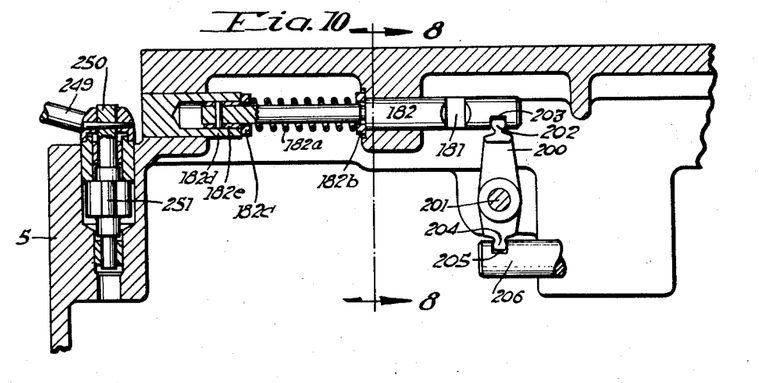
Figure 10 is an enlarged fragmentary section on the line 10—10 of Figures 7 and 8.

Normally the side faces 186 and 187 of the yoke 180 nicely fit between the positioning pins 188 and 189 to permit free rocking motion sideways of the lever 10 from position 10a—10b or to position 10c—10d. When the control lever 10 is moved to the speed selecting position, i. e., swung to the left into the position 10a—10b its end face 190 swings into the slot 181 of the plunger 182 to thereby connect the handle 10 for axial movement of the plunger 182. The plunger 182 is normally centralized in its axial movement for proper entry or withdrawal of the yoke 180 when no speed changes are being effected by a spring 182a, Figure 10, which bears against the knee 5 through a washer 182b at one end and at the other end through a washer 182c which can also engage the bearing bushing 182d fixed in the knee 5 and a collar 182e fixed to the plunger 182. It will therefore be obvious that the plunger may be moved axially in either direction, compressing the spring 182a, which will cause return of the plunger to a central position when released by the yoke 180. At this time the shifting yoke 180 has moved out from between the positioning pins 188 and 189 so that its surface 191 is free to pass these pins and assume a position 180a with the handle moved toward the knee of the machine for instituting the increasing speed changes and into position 180b for instituting decreasing series of speed changes. In either of these positions the surface 191 is respectively behind the pin 188 or 189, Figure 14, so that the lever cannot return to the central position until it is midway between the selecting positions 10a and 10b. A pair of stop pins 193 and 194 are also provided which engage the side faces 186 and 187 of the shifting yoke 180 to limit the axial movement thereof and the shaft 178 for accurately positioning the handle 10 in either of the positions 10a or 10b.

When the lever 10 is swung to the right to effect feed changes, the surface 191 of the shifting yoke 180 moves into the actuating slot 183 of the shuttle valve 185 so as to connect the handle 10 to the feed changing control mechanism. Under these latter conditions the shifting yoke 180 is swung between the positioning pins 188 and 189 but the yoke 180 is permitted axial movement and likewise the shaft 178 can move axially since there is a clearance slot 192 formed therein so that the positioning pins 188—189 are straddled by the slot when the shifting yoke is in the relative positions 180c and 180d corresponding to the positions 10c and 10d of the control lever 10.

In order normally to keep the handle 10 in the central position indicated at 10 in Figure 4 and with the shifting yoke 180 in the position shown in Figure 8 and in full line in Figure 14, a centralizing spring arrangement shown best in Figure 8 is provided, comprising a small depending integral lug 195 formed on the shifter yoke 180 fixed to the shaft 178 which operates between a pair of spring urged collars 196 slidably mounted on a suitable stud 197 fixed to the knee 5 of the machine. A pair of springs 198 each side of the sleeves 196 and respectively engaging against the fixed portion of the knee of the milling machine through the medium of the fixed collar 199 on the stud 197 and directly against the mounting means on the knee 5, provides means for normally keeping the handle in central position while permitting rocking movement of it to any of the desired selectable positions 10a—10b or 10c—10d, while at the same time providing automatic return of the handle to the central position when released by the operator.

When the lever is swung to the left into the operating position 10a—10b and the shifting yoke 180 is in the slot 181 of the plunger 182, movement of the control lever 10 into either position 10a or 10b causes sliding motion in the plunger 182 which is transmitted through a lever 200 pivotally mounted on a suitable pin 201 in the knee 5 and which has an appropriate lug 202 operating in a slot 203 in the plunger 182 and has a similar lug 204 on its other end which operates in a corresponding slot 205 in the shifter rod 206, which is slidably mounted in the knee 5. This rod 206 extends to the rear of the knee and projects outwardly past a parallel motion bar arrangement for conveying motion of the rod 206 at all times to mechanism in the column 2 for any relative vertical position of the knee 5 on the column.

Figures 11, 12, 12A, 12B, 13:
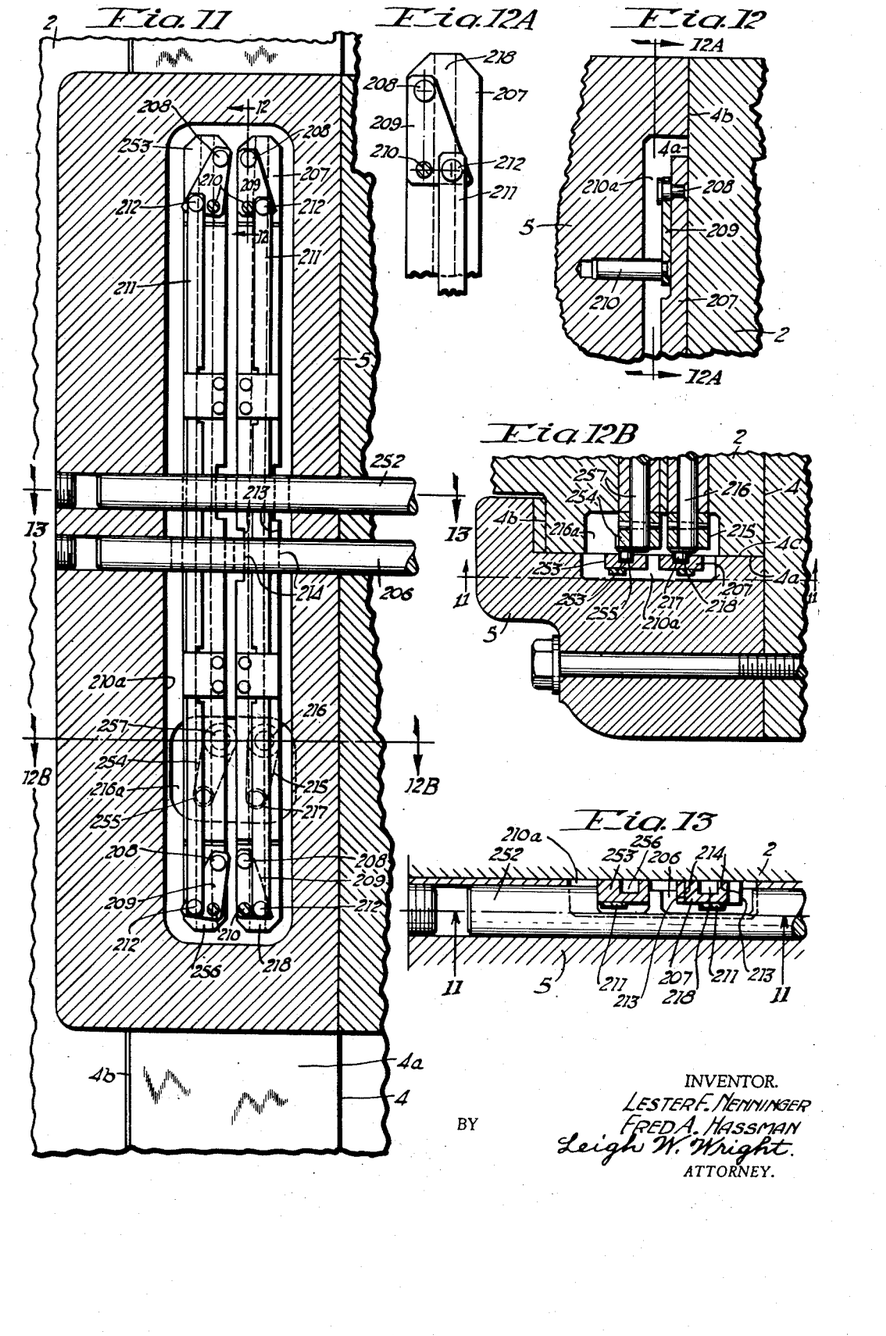
Figure 11 is an enlarged sectional view seen from the left hand side of the machine showing the totally enclosed parallel bar motion transfer mechanism on the line 11—11 of Figures 12B and 13.
Figure 12 is a fragmentary enlarged sectional view of the mechanism shown on the line 12—12 of Figure 11 as seen from the front of the machine.
Figure 12A is an enlarged sectional view on the line 12A—12A of Figure 12.
Figure 12B is an enlarged sectional view on the line 12B—12B of Figure 11.
Figure 13 is a fragmentary section on the line 13—13 of Figure 11.

This parallel motion transferring mechanism, Figures 11, 12, 12A, 12B and 13, comprises a bar 207 which is pivotally mounted on the pins 208 of a pair of crank arms 209 which in turn are pivotally mounted on suitable pins 210 in a pocket 210a formed in the guideway surface 4c of the knee of the milling machine, Figure 12B, so that as the bar 207 is moved back and forth horizontally it will remain in vertical parallelism during such movement. In order to maintain a high degree of accuracy of this parallel movement a supplementary tie bar 211 is provided which is mounted on pins 212 on the crank arms 209 so that the relationship of the pivots 208—210 and 210—212 lie in planes substantially perpendicular to each other to in this way minimize irregular motion which might otherwise be caused in the parallel bar 207 when pushed at one or the other of its extreme ends.

The shifter rod 206 is adapted to horizontally push or pull the parallel bar 207 to effect its parallel motion, Figure 13, by providing in the bar a slot having the side faces 214 which nicely engage mating surfaces 213 formed on the bar 207, while permitting limited up and down motion of the bar 207 relative to the shifter rod 206 during the actuation of the bar 207 in parallel motion.

Reciprocation of the bar 206 by the handle 10 causes similar motion in the parallel bar 207 which is conveyed to the lever arm 215, Figure 6, carried on a rock shaft 216 in the column 2 by a pin 217 fixed in the end of the lever. This pin nicely fits in the longitudinally extending slot 218 formed in the parallel bar 207.

It is to be noted, with particular reference to Figures 11 and 12B, that the lever 215 and pin 217 are contained in a pocket 216a formed in the guideway surface 4a of the column 2. The two pockets 210a and 216a are cooperatively positioned relative to each other so as to form a chamber for at all times totally enclosing the parallel bar motion transfer mechanism for any position of movement of the knee 5 or the column 2.

Rocking motion from the shaft 216 is conveyed through a suitable lever arm 219 fixed thereto which actuates a push rod 220 slidably mounted in the column 2 and which has a suitable shifter yoke 221 operating the shifter spool 222 of the clutch shifting rod 223 for actuating the jaw clutch 143 to engage it with either bevel gear 140 or bevel gear 141. Thus, as the control lever 10 is moved either into position 10a or 10b, one or the other of the clutches 140 or 141 will be engaged to effect rotation of the hydraulic gear shifting selector valve 146 in one direction or the other to effect the various gear changes in the spindle speed transmission. The operator in manipulating the handle 10 in these positions need only watch the indicating dial 150 to see what speed is being selected, and since it may be rotated in either direction through the medium of the clutch 143 and associated reversing bevel gearing 140—141, the range of speeds may be selected progressively at increasing rates or progressively at decreasing rates as desired and also the change from the highest range to the lowest range or vice versa may also be instantly effected.

A supplemental control lever 224, Figures 1 and 6, carried on a rock shaft 225 mounted in the column 2 and having a lever 226 fixed thereon and operating with the push rod 220 in the same fashion as the lever 219 above described provides manual control means for effecting speed changes in the spindle speed transmission from a control lever located on the column 2 of the machine.

When the control lever 10 is moved into the positions 10c or 10d for effecting feed changes for the knee, saddle and table members, the shifter yoke 180 is swung into the notch 183 in the shuttle valve 184 so that this valve may be reciprocated manually in the sleeve 185 of said valve. Normally, after the desired spindle speed and desired feed have been selected and with the control lever 10 in the central position shown at 10 in Figure 4, fluid pressure from a suitable fluid pressure pump 227 is derived from the fluid pressure reservoir 64 through a line 228 and is delivered under pressure through a line 229 to the port 230 in the sleeve 185 of the shuttle valve 184 and is discharged through the lines 231 and 232 into the respective cylinder chambers 233 and 234 of the hydraulic actuating means for operating the clutch 159 for the power shifting of the feed change speed transmission. In each of the cylinders 233 and 234 are slidably mounted the sleeve pistons 235 and 236 inside of which also slides the shifter yoke piston rod 237 to which is attached the shifter yoke 238 connected to the clutch 159. Under these conditions of the simultaneous application of fluid pressure to both cylinder 233 and 234 the sleeve pistons 235 and 236 will both be projected toward each other as shown best in Figure 15 so as to confine the movement of the shifter yoke 238 between them to centralize the clutch 159 in inoperative position. Thus, no shifting of the feed transmission is taking place under these conditions.

When the control lever 10 is moved into one or the other of the positions 10c or 10d the shuttle valve plunger 184 will be so moved to at one time connect the fluid pressure from line 229 and port 230 to line 231 to apply pressure to the cylinder chamber 233 while connecting the line 232 from the cylinder chamber 234 to the exhaust drain line 239 returning exhausted fluid to the reservoir 64. When the lever 10 is moved to the other position the valve will be shifted in the opposite direction to apply pressure to the line 232 into the cylinder chamber 234 and permit exhaust fluid to escape from the cylinder chamber 233 to the drain line 239. It can be seen that when pressure is applied only in one of the cylinder chambers 233 or 234 the rod 237 will be moved by fluid pressure toward the exhausting cylinder chamber and will likewise carry with it the respective sleeve 235 or 236 to permit movement and the corresponding engagement of the clutch 159 with one or the other of the beveled gears 156 or 156 to thereby institute the power driving of the gear shifting mechanism for the feed change transmission in one direction or the other.

The feed changes may also be effected by a rear control lever 240, Figures 1 and 15, mounted on the knee of the machine to the rear of the work table for actuating the shuttle valve 184 in either direction by fluid pressure in addition to the mechanical actuation of the valve by the lever 10 as previously described. Pressure is derived from the line 229 which is connected to a control valve 241 appropriately operated through suitable linkage 242 from the control lever 240 which reciprocates this plunger 243 to at one time connect fluid pressure from the pressure line 229 through the line 244 into a chamber 245 at one end of the shuttle valve sleeve 185 and to connect the other chamber 246 at the other end of the valve 184 through the line 247, through the valve 241, to the exhaust line 239 so as to move the shuttle valve sleeve in one direction. The reverse movement of the valve 184 may be readily effected by actuating the valve 241 in the opposite direction by the lever 240 whereupon fluid pressure in the line 229 is then conveyed through line 247 to the chamber 246 of the valve 184 while exhaust fluid is conveyed from the chamber 245 through the line 244, the valve 241 into the drain line 239. Suitable spring urged centralizing means shown generally at 248 serve to normally keep the valve 241 in a central inoperative position with no pressure being applied from line 229 to either of the lines 244 or 247. The shuttle valve 184 is also normally maintained centralized by the springs 185a in the position shown in Figure 15 when no pressure is applied in either chamber 245 or 246.

The servo-operated spindle clutch and brake mechanism, Figure 15, is controlled from an operating lever 249 mounted on a suitable rock shaft 250 on the front of the knee as shown in Figures 1, 4, and 7 which has a suitable projecting lug 251 which operates an appropriate notch in the actuating rod 252, Figure 7, which extends to the rear of the knee, similar to the rod 206, and is similarly attached to a second parallel motion operating bar 253, Figure 11, which is mounted on suitable crank arms 209 as is the member 207 to in this way convey movement of the control rod 252 to mechanism in the column for any relative vertical position of the knee thereon. A suitable lever arm 254, Figure 6, having a pin 255 operating in the vertical slot 256 in the parallel motion bar 253 is carried on a rock shaft 257 to which is fixed the shifter arm 258 properly connected to the actuating spool 56 of the hydraulic servo-clutch and brake operating mechanism shown in Figure 15. A similar control lever 259 is also provided on the side of the column of the machine on a suitable rock shaft 260 and through a suitable lever 261 and the shifter rod 262 and the lever arm 263 fixed on the rock shaft 257 provides a control on the column operable in conjunction with the control lever 249 on the front of the knee. Manipulation of either of these levers 249 or 259 controls the operation of the hydraulic servo-clutch and brake mechanism for starting or stopping spindle rotation.

Means are provided in connection with the control of the spindle speed change mechanism whereby the main drive clutch for rotating the tool spindle must be disengaged before any speed changes can be effected. This mechanism comprises an interference detent arrangement, Figure 6, comprising a ball detent 264 carried in the column 2 to position the servo-clutch control rod 262 normally in the disengaged position of the main drive clutch 14 and a second ball detent arrangement 265 carried in the column to provide means for normally positioning the control rod 220 in cooperation with the centering spring 182a in the knee, Figure 10, for rendering the power gear shifting mechanism for the spindle speed transmission normally inoperative. Between these two bars is also provided an interference ball detent 266 which permits the operation of either the rod 262 or the rod 220 only when one or the other is in the normal position as determined by the respective detents 264 or 265. In other words, the rod 220 cannot be moved in either direction to effect engagement of the clutch 143 unless the rod 262 of the servo-clutch operating mechanism is positioned in the disengaged position of the driving clutch in the pulley 14. Likewise when the rod 220 is in one or the other of its positions of clutch engagement of the clutch 143 of the bevel gears 140 or 141 the servo-clutch control rod 262 and associated mechanism cannot be moved from the disengaged position as to prevent the spindle from being inadvertently started during speed changes in the spindle speed transmission.

When feed changes are to be selected, means is provided for automatically disconnecting feed power from the work table, saddle and knee so as to effect the changes of speed in the feed transmission when no feeding loads are imposed thereon. This mechanism is illustrated best in Figure 15 which shows the positions when the machine is in normal operation with the spindle running and no speed or feed changes being made. Under these conditions, fluid pressure from the line 229 coming from the fluid pressure pump 227 passes through the shuttle valve 185 into the line 267, through the spindle stop control valve 268, into the line 269 connected to the actuating cylinder chamber 270 in which operates the feed clutch shifter piston 271 to which is connected a shifter yoke 272 properly connected to the shiftable feed clutch 124. Exhaust from the cylinder chamber 273 which carries the other end of the piston 271 is conveyed through the line 274 through the valve 268 into the line 275, and through the shuttle valve 184, into the drain line 239 so that normally fluid pressure is applied in the cylinder 270 to maintain the feed clutch 124 in engagement with its mating member 125 to maintain feed drive power to the knee, saddle, and table elements when the spindle is running.

When the control lever 10 is moved to either of the positions 10c or 10d for initiating feed changes, the shuttle valve will be so moved as to apply pressure in each case from the line 229 to cylinder 273 through line 275, the valve 268, and through line 274 to move the piston 271 to the right, Figure 15, to thereby disengage the feed clutch 124. When the handle 10 is again allowed to come back to neutral position, the shuttle valve will again resume the position in Figure 15 to initiate reengagement of the feed clutch 124 by the application of pressure in the cylinder 270 by connecting pressure from line 229, through line 267, valve 268, and line 269. Under these conditions, the control valve 268 is in the released normal running position with its plunger 271 in the depressed position as shown in Figure 15. Thus is provided automatic means for disconnecting feed driving power from the change feed transmission when selecting any feed changes and to automatically reengage the feed drive power when the desired feed has been selected.

It is also the purpose to provide an arrangement in conjunction with this transmission and control mechanism whereby the feed drive power is automatically disconnected whenever the cutter spindle drive is stopped in order to prevent an otherwise continuation of the feed of the work piece against the cutter when not rotating, resulting in obvious damage to the machine mechanism. The spindle control valve 268 having the plunger 271', which is shown in normal depressed running position in Figures 10 and 15, has its plunger actuated by a cam 272' fixed to the rock shaft 257 of the hydraulic servo-operated drive clutch operating mechanism. When the servo-clutch is operated by manipulating levers 249 or 259 to stop spindle rotation as in swinging the rock shaft 257 clockwise from the run position to the stop position, the valve plunger 271' will be moved under the influence of the spring 268' to permit fluid pressure from the line 229 to pass through the valve 268, into the line 274 whereby pressure is applied to the feed clutch cylinder 273 to disengage the feed clutch 124. Exhaust fluid from the cylinder 270 passes out through line 269, the valve 268, and into the drain line 239 appropriately connected to the valve 268 for return of fluid to the reservoir 64.

Similarly, when the spindle drive is again reengaged by operating the control levers 249 or 259 the valve 268 will have its plunger moved down to the position shown in Figure 15 to again automatically reengage feed clutch 124. Then, whenever the spindle rotation is stopped, the feed transmission 114 is automatically disengaged from the work table, saddle, and knee members.

What is claimed is:

1. In a machine tool, having a rotatable spindle and a feeding member, a change speed transmission for said spindle and a change feed transmission for said feeding member, a power means for effecting the speed changes in said first-mentioned transmission and a second power means operable to effect feed changes in said second-mentioned transmission, a common centralized control mechanism for rendering said power means selectively effective comprising, a single operating control lever having a neutral position and shiftable into and movable in one plane of movement for effecting increasing or decreasing speed changes in said first-mentioned transmission and operably shiftable into and movable in another plane of movement to effect increasing or decreasing feed changes in said feed change transmission, a main drive motor for driving both of said transmissions and said power means for effecting the speed changes therein, means for disconnecting driving power from said main drive motor to said change speed transmission when changes of speed are being effected therein, means operable by said single control lever for disconnecting power from said change feed transmission to said feeding member when feed changes are being effected therein, and additional means for disconnecting said feed transmission from said feeding member when said main drive motor is disconnected from said speed transmission.

2. In a milling machine, a column, a knee mounted on said column having a saddle and work table, a cutter spindle, a change speed transmission for effecting a plurality of different rates of rotation for said cutter spindle, a main drive motor for driving said transmission, a change feed transmission for actuating said knee, saddle, and table at a plurality of feeding rates, means for driving said change feed transmission from said main drive motor, a single operative control member mounted on the front of said knee operable to selectively effect speed changes in said cutter spindle transmission and to effect feed changes in said feed transmission for the knee, saddle, and table, a control lever on said column operable in conjunction with said single lever control for effecting speed changes in said cutter spindle transmission only, a control lever on the rear of said knee operable in conjunction with said single lever control to effect only feed changes in said feed transmission for the knee, saddle, and table, and interlock means to prevent simultaneous actuation of the control levers reacting on said single lever control, said lever for said spindle speed changes and the lever for said feed changes, whereby only one of said three levers may be operated at any one time.

3. In a machine tool transmission and control mechanism, a rotatable spindle, a change speed transmission associated with said spindle, a prime mover for driving said transmission and spindle, a feeding member, a change speed transmission associated with said feeding member, means for driving said change feed transmission from said prime mover, means for connecting or disconnecting said prime mover from driving relationship with said change speed transmission, fluid pressure means for operating said connecting and disconnecting means, means for continuously connecting said prime mover to said change feed transmission, connecting and disconnecting means between said change feed transmission and said feeding member, fluid pressure means for operating said second-mentioned connecting and disconnecting means, a fluid pressure selector valve movable in opposite directions, for effecting increasing and decreasing speed changes in said change speed transmission, power means for effecting feed changes in said change feed transmission, a fluid pressure shuttle control valve movable in opposite directions for feed increases and decreases, said valve being operable to control the power feed changing means for said feed transmission and for connecting and disconnecting said feed change transmission relative to said feeding member in a predetermined sequential operation in which said feed transmission is disconnected from driving said feeding member when said shuttle valve is operated to effect feed changes in said transmission, and a single lever control mechanism selectively operable to actuate the fluid pressure selector valve in said opposite directions for effecting speed changes in the change speed transmission or to actuate said shuttle control valve in said opposite directions for effecting feed changes in said feed transmission.

4. In a milling machine, a column, guideways on said column, a knee having cooperating guideways thereon, control means on said knee, mechanism to be controlled in said column, parallel bar motion transfer apparatus located in an elongated pocket in a guideway of said knee extending in the direction of relative movement of said knee on said column, means located in a pocket in a cooperating guideway of said column for connecting motion from said parallel bar apparatus to said mechanism to be controlled, said pockets in said knee and column guideways being so arranged as to form a structure totally enclosing said parallel bar transfer mechanism for any position of said knee on said column.

5. In a change speed transmission and control mechanism for a milling machine, a change speed transmission for operating the tool spindle at a plurality of different speeds, a change feed transmission for operating a feeding member at a plurality of feed rates, a single lever control having separate operative positions to determine selectively the speed or feed transmission to be controlled, independent controllers for said transmissions engageable by the lever, said lever when selectively positioned being movable into additional operative positions, thereby actuating the selected controller to effect increasing or decreasing rates of selected speeds respectively in the change speed transmission or the change feed transmission, and reversible power means including an individual reverser coupled with each controller and rendered operative by the movement of said single lever and the selected controller in said last-mentioned operative positions for effecting respectively increasing and decreasing rate output changes as respects the selected of said transmissions.

6. In a machine tool organization including a support member having a spindle rotatably mounted therein and a variable speed transmission for effecting rotation of said spindle, a work supporting member movable with respect to the spindle and having a variable speed transmission mounted therein for effecting said movement, separate power means including independent reversers for effecting rate changes in said variable speed transmissions, juxtapositioned controls for said power rate changers carried by the movable member, said controls each being shiftable to operate one of the reversers and to effect both increase and decrease of the output rate of its associated variable speed transmission, a single control member carried by the movable member, and means mounting said control member for initial selective movement to engage one or the other of the juxtapositioned controls and for subsequent movement when in a selected position to shift a selected control to effect alternative increases or decreases in the output rate of its associated transmission.

7. In a machine tool organization including a support member having a spindle rotatably mounted therein and a variable speed transmission for effecting rotation of said spindle, a work supporting member movable with respect to the spindle and having a variable speed transmission mounted therein for effecting said movement, separate power means for effecting rate changes in said variable speed transmissions, juxtapositioned controls for said power means carried by the movable member, said controls each being shiftable to effect alternatively increase or decrease of the output rate of its associated controlled power rate changing means, a single control member carried by the movable member, and means mounting said control member for initial selective movement to engage one or the other of the juxtapositioned controls and for subsequent movement when in a selected position to shift a selected control to effect increases or decreases in the output rate of its associated transmission, one of said juxtapositioned controls comprising a hydraulic valve member in direct hydraulic connection with one of the power shift mechanisms for determining the operation thereof and the other of said controls comprising mechanically shiftable elements movable in accordance with the shifting of the single control member.

8. In a machine tool organization including a support member having a spindle rotatably mounted therein and a variable speed transmission for effecting rotation of said spindle, a work supporting member movable with respect to the spindle and having a variable speed transmission mounted therein for effecting said movement, separate power means for effecting rate changes in said variable speed transmissions, juxtapositioned controls for said power rate changers carried by the movable member, said controls being shiftable to effect both increase and decrease of the output rate of the variable speed transmissions, a single control member carried by the movable member, means mounting said control member for initial selective movement to engage one or the other of the juxtapositioned controls and for subsequent movement when in a selected position to shift a selected control to effect increases or decreases in the output rate of its associated transmission, one of said juxtapositioned controls comprising a hydraulic valve member in direct hydraulic connection with one of the power shift mechanisms for determining the operation thereof, and means for alternatively determining the position of said hydraulic valve including a reversible hydraulic circuit, a reversing valve member for controlling the flow through said hydraulic circuit, and means remote from the first control member for selectively determining the position of the reversing valve and thus the reaction of the hydraulic circuit on the first-mentioned valve.

9. In a machine tool organization including a support member having a spindle rotatably mounted therein and a variable speed transmission for effecting rotation of said spindle, a work supporting member movable with respect to the spindle and having a variable speed transmission mounted therein for effecting said movement, separate power means for effecting rate changes in said variable speed transmissions, juxtaposition controls for said power rate changers carried by the movable member, said controls being shiftable to effect both increase and decrease of the output rate of the variable speed transmissions, a single control member carried by the movable member, means mounting said control member for initial selective movement to engage one or the other of the juxtaposition controls and for subsequent movement when in a selected position to shift a selected control to effect increases or decreases in the output rate of its associated transmission, one of said juxtapositioned controls comprising a hydraulic valve member in direct hydraulic connection with one of the power shift mechanisms for determining the operation thereof and the other of said controls comprising mechanically shiftable elements movable in accordance with the shifting of the single control member, and means for alternatively determining the position of said hydraulic valve including a reversible hydraulic circuit, a reversing valve member for controlling the flow through said hydraulic circuit, and means remote from the first control member for selectively determining the position of the reversing valve and thus the reaction of the hydraulic circuit on the first-mentioned valve, an additional remotely situated control lever, and operative motion transmitting connections between said control lever and the mechanical shifting mechanism selectively engageable by the first-mentioned control member for alternatively actuating said mechanical shifting means.

10. In a change speed transmission and control mechanism for a machine tool, a change speed transmission for operating a spindle at a plurality of different speeds, a change feed transmission for operating a feeding member at a plurality of feed rates, independent power controls each including an individual reverser for determining alternatively increases or decreases in the respective output rates of said transmissions, a first joint control member selectively movable into operative relation with one or the other of said power controls and subsequently operable to react thereon to produce either said increases or decreases in the output rate of the selected transmission control, and separate remote controls individual respectively to each of said power means for independently determining rate changes in the respective transmissions.

11. In a change speed transmission and control mechanism for a machine tool, a change speed transmission for operating a spindle at a plurality of different speeds, a change speed transmission for operating a feed member at a plurality of feed rates, independent power means for adjusting said transmissions to effect increases and decreases in the ultimate speed and feed rates transmittable thereby, and control means for said transmission adjusting mechanisms including independent reversers, juxtapositioned controllers individual to the respective reversers, and a single control lever supported intermediate said juxtapositioned controls and selectively oscillatable into actuating engagement with one or the other of said controls, said lever being mounted for additional oscillation in a second direction to shift the selected reverser control to effect increasing or decreasing rates of selected speeds in its associated transmission.

12. In a machine tool transmission and control mechanism, a shiftable gear change speed transmission for driving a member at a plurality of different rates, a prime mover for actuation of said transmission, clutch means for controlling the coupling of the prime mover to the transmission, power shifting means for effecting changes in the rate transmittable by the change feed transmission, a reverser for determining the directional actuation of said power shifting means, hydraulic motors for determining the position of the coupling clutch and of the reverser, a source of hydraulic pressure fluid, and valve means intervening the source and said hydraulic motors, said valve means being shiftable into different positions for different operative actuations of the hydraulic motor for the reverser, and conduits couplable by said valve means intervening the clutch hydraulic motor and the pressure source for coupling pressure to said motor to shift the clutch into inoperative position when the valve is positioned for any effective coupling of the reverser.

13. In a machine tool of the type embodying a rotatable spindle and an element translatable with respect to said spindle, transmission and control mechanism for said parts including an actuator for the spindle, a controller for determining the coupling of the actuator with the spindle, an organized variable speed transmission for actuation of the translatable member, clutch means for determining the operative coupling of said transmission, a power adjuster for said transmission, a hydraulic control system for said parts including a source of actuating medium, a hydraulic motor for determining the position of the clutch, serially disposed valve elements intervening the source and motor, an actuator for shifting one of said valve elements to actuate the motor for disconnection of the clutch, and means operable by the spindle controller for actuating the other of said valve elements to effect corresponding actuation of said clutch member.

14. In a machine tool of the type embodying a rotatable spindle and an element translatable with respect to said spindle, transmission and control mechanism for said parts including an actuator for the spindle, a controller for determining the coupling of the actuator with the spindle, an organized variable speed transmission for actuation of the translatable member, clutch means for determining the operative coupling of said transmission, a power adjuster for said transmission, a hydraulic control system for said parts including a source of actuating medium, a hydraulic motor for determining the position of the clutch, serially disposed valve elements intervening the source and motor, an actuator for shifting one of said valve elements to actuate the motor for disconnection of the clutch, an additional hydraulic actuator alternatively operable to shift said valve element, and means operable by the spindle controller for actuating the other of said valve elements to effect corresponding actuation of said clutch member.

15. In a machine tool of the type embodying a rotatable spindle and an element translatable with respect to said spindle, transmission and control mechanism for said parts including an actuator for the spindle, a controller for determining the coupling of the actuator with the spindle, an organized variable speed transmission for actuation of the translatable member, clutch means for determining the operative coupling of said transmission, a power adjuster for said transmission, a hydraulic control system for said parts including a source of actuating medium, a hydraulic motor for determining the position of the clutch, serially disposed valve elements intervening the source and motor, an actuator for shifting one of said valve elements to actuate the motor for disconnection of the clutch, control means for the power adjuster, means in the valve to selectively couple the source with the control means to actuate same as the valve is shifted, and means operable by the spindle controller for actuating the other of said valve elements to effect corresponding actuation of said clutch member.

16. In a machine tool of the type embodying a rotatable spindle and an element translatable with respect to said spindle, transmission and control mechanism for said parts including an actuator for the spindle, a controller for determining the coupling of the actuator with the spindle, an organized variable speed transmission for actuation of the translatable member, clutch means for determining the operative coupling of said transmission, a power adjuster for said transmission, a hydraulic control system for said parts including a source of actuating medium, a hydraulic motor for determining the position of the clutch, serially disposed valve elements intervening the source and motor, an actuator for shifting one of said valve elements to actuate the motor for disconnection of the clutch, control means for the power adjuster, means in the valve to selectively couple the source with the control means to actuate same as the valve is shifted, an additional hydraulic actuator alternatively operable to shift said valve element, and means operable by the spindle controller for actuating the other of said valve elements to effect corresponding actuation of said clutch member.

17. The combination with an organized variable speed transmission for a machine tool or the like and a prime mover for actuation of said transmission, of a clutch element for operatively connecting the prime mover and said transmission, power means for effecting shifting of the gears of said transmission to increase or decrease the rate transmittable thereby, driving means for said power shifter including a reverser, a first hydraulic motor for effecting disconnection of the transmission clutch, a second hydraulic motor for effecting opposite directional couplings of the reverser, a hydraulic control system for said motors including a source of actuating medium and a control valve intervening the motors having a first position effective to couple the source with the clutch motor for effecting the driving of the transmission and having two additional positions effective to couple the source with the reverser motor for selective positioning of the reverser, said valve including portions coupling the pressure source with the clutch motor to disconnect the clutch when the valve is in either of said additional positions.

18. The combination with an organized variable speed transmission for a machine tool or the like and a prime mover for actuation of said transmission, of a clutch element for operatively connecting the prime mover and said transmission, power means for effecting shifting of the gears of said transmission to increase or decrease the rate transmittable thereby, driving means for said power shifter including a reverser, a first hydraulic motor for effecting disconnection of the transmission clutch, a second hydraulic motor for effecting opposite directional couplings of the reverser, a hydraulic control system for said motors including a source of actuating medium and a control valve intervening the motors having a first position effective to couple the source with the clutch motor for effecting the driving of the transmission and having two additional positions effective to couple the source with the reverser motor for selective positioning of the reverser, said valve including portions coupling the pressure source with the clutch motor to disconnect the clutch when the valve is in either of said additional positions, a first means for positively shifting the valve into its selected positions, and a remote hydraulic control means for effecting independent shifting of the valve into the additional reverser controlling positions.

19. The combination with an organized variable speed transmission for a machine tool or the like and a prime mover for actuation of said transmission, of a clutch element for operatively connecting the prime mover and said transmission, power means for effecting shifting of the gears of said transmission to increase or decrease the rate transmittable thereby, driving means for said power shifter including a reverser, a first hydraulic motor for effecting disconnection of the transmission clutch, a second hydraulic motor for effecting opposite directional couplings of the reverser, a hydraulic control system for said motors including a source of actuating medium and a control valve intervening the motors having a first position effective to couple the source with the clutch motor for effecting the driving of the transmission and having two additional positions effective to couple the source with the reverser motor for selective positioning of the reverser, said valve including portions coupling the pressure source with the clutch motor to disconnect the clutch when the valve is in either of said additional positions, a first means for positively shifting the valve into its selected positions, a remote hydraulic control means for effecting independent shifting of the valve into the additional reverser controlling positions, an additional control valve intervening the source and the clutch motor, and means independent of the first valve and its controls for actuating the second valve to operate the clutch motor for disconnection of the clutch.

LESTER F. NENNINGER.
FRED A. HASSMAN.

REFERENCES CITED

The following references are of record in the file of this patent:

UNITED STATES PATENTS

| Number | Name | Date |
|---|---|---|
| 1,693,446 | Kearney | Nov. 27, 1928 |
| 1,845,844 | Korsmo | Feb. 16, 1932 |
| 1,914,167 | Romaine et al. | June 13, 1933 |
| 1,919,150 | Nenninger | July 18, 1933 |
| 1,961,129 | DeHaas et al. | June 5, 1934 |
| 1,978,354 | Nenninger et al. | Oct. 23, 1934 |
| 2,008,983 | Kearney | July 23, 1935 |
| 2,053,886 | Williams | Sept. 8, 1936 |
| 2,164,884 | Nenninger et al. | July 4, 1939 |
| 2,202,766 | Trosch | May 28, 1940 |
| 2,349,595 | Martelloti | May 23, 1944 |
| 2,389,627 | LeBlond et al. | Nov. 27, 1945 |